Jan. 20, 1970    R. E. STOBBE    3,491,278
PRESET DIMENSION COMPENSATOR FOR A NUMERICAL CONTROL SYSTEM
Filed June 28, 1967    5 Sheets-Sheet 1
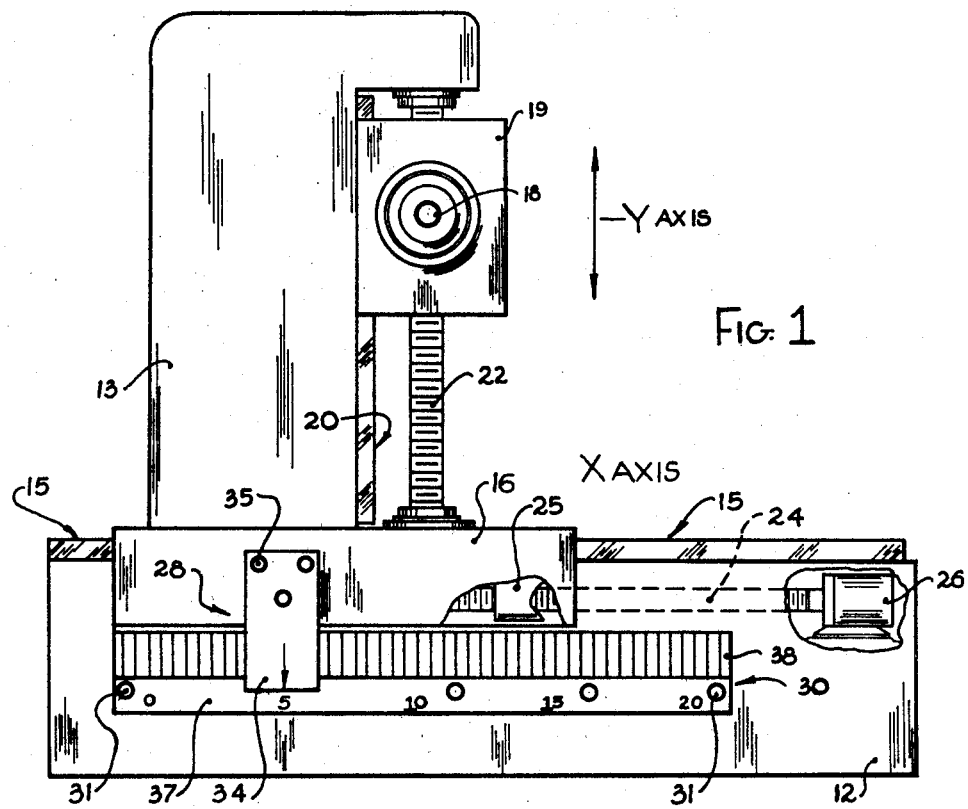
FIG. 1
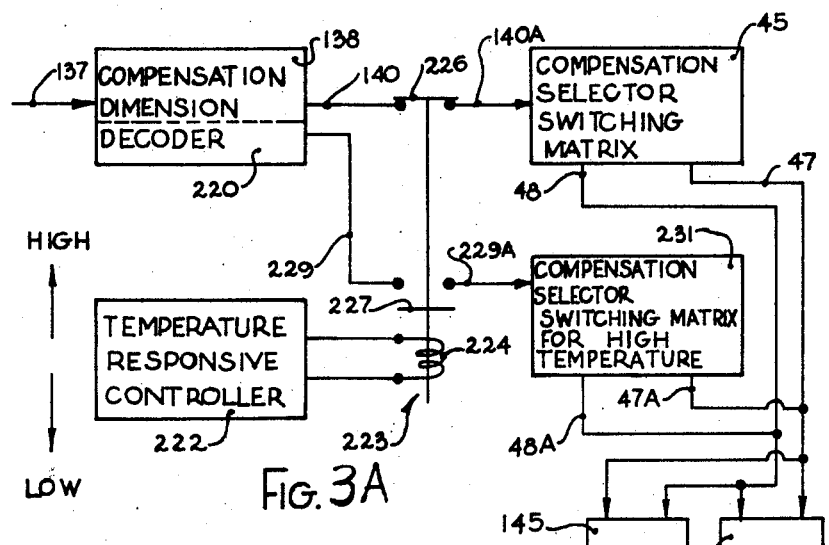
FIG. 3A
FIG. 2
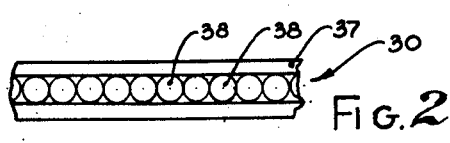
INVENTOR.
RICHARD E. STOBBE
BY William C. Gleisner Jr.

INVENTOR
RICHARD E. STOBBE

ATTORNEY

Jan. 20, 1970 R. E. STOBBE 3,491,278
PRESET DIMENSION COMPENSATOR FOR A NUMERICAL CONTROL SYSTEM
Filed June 28, 1967 5 Sheets-Sheet 5
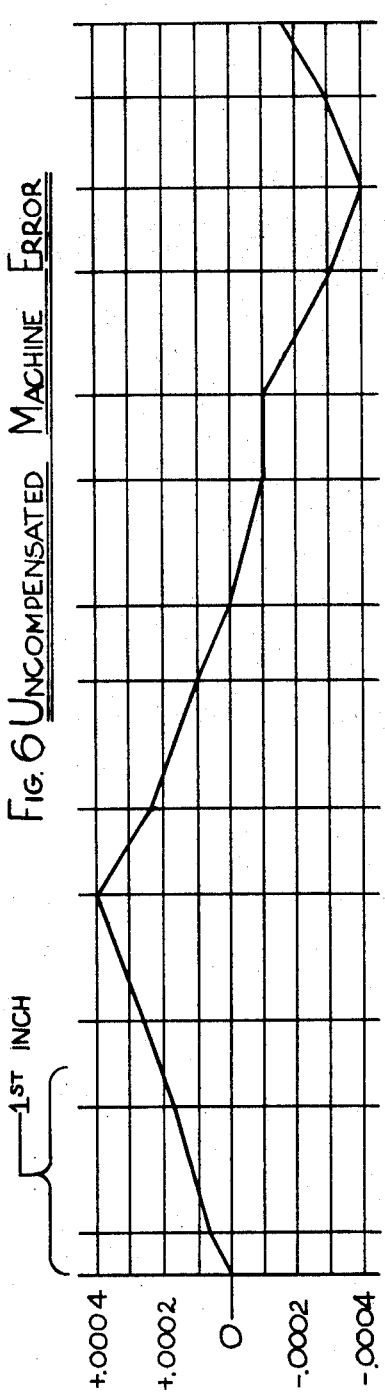
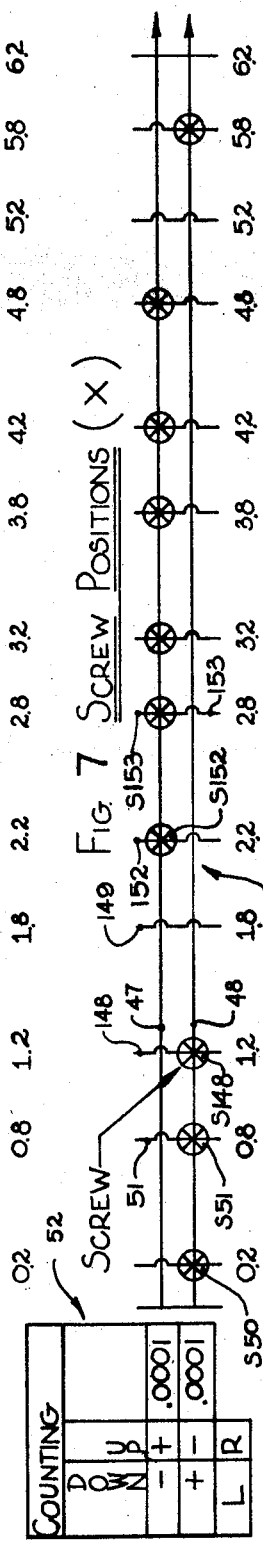
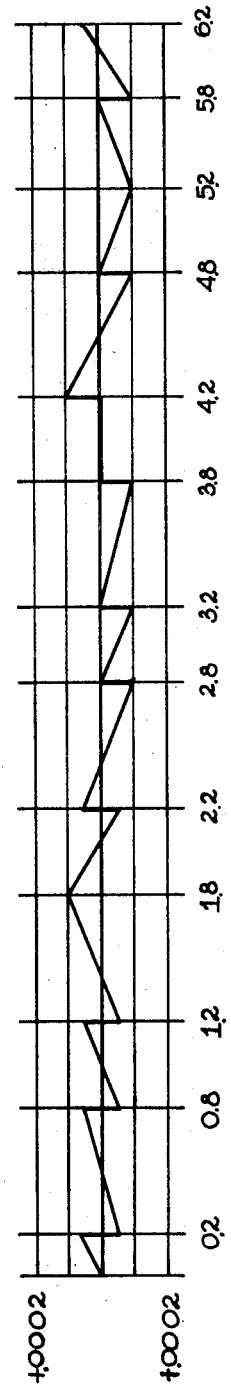
INVENTOR.
RICHARD E. STOBBE
BY William C. Gleisner Jr.

United States Patent Office 3,491,278
Patented Jan. 20, 1970

3,491,278
PRESET DIMENSION COMPENSATOR FOR A
NUMERICAL CONTROL SYSTEM
Richard E. Stobbe, Greenfield, Wis., assignor to Kearney
& Trecker Corporation, West Allis, Wis., a corporation
of Wisconsin
Filed June 28, 1967, Ser. No. 649,703
Int. Cl. H02p 1/54
U.S. Cl. 318—18                                    6 Claims

ABSTRACT OF THE DISCLOSURE

In combination with a pulse counting numerical control system for a machine tool, a servo power drive is connected via a translating mechanism to effect selective positioning movement of a slidable machine member. An electrical transducer operatively interconnected between the positionable member and a support frame therefor is responsive to a data source of digital input command pulses for controlling the servo drive to effect selective movement of the slidable member to a predetermined position along the frame. The present invention includes a presettable signal modifier operative to add or subtract a predetermined number of pulses to those supplied by said data source at different spaced apart points along the same directional path of movement. The selectively preset signal modifier is interposed in a control system adapted to transmit command data from the data source to the transducer for moving the positionable member. The signal modifier is selectively preset to compensate for any combination of inaccuracies resulting from machine errors in the translating mechanism, control errors in the position measuring transducer, and changes in operating temperature.

---

This invention relates to a presettable signal modifying apparatus for predeterminately adding or subtracting control pulses in the positional control signal of a pulse counting system for a machine tool.

A principal object of this invention is to provide an improved and selectively presettable signal modifier for a pulse counting numerical control system.

Another object of the invention is to provide a presettable signal modifier adapted to add or subtract control pulses as required to compensate for mechanical errors in a machine tool translating mechanism.

Another object of the invention is to provide a signal modifier presettable to add or subtract pulses for predeterminately varying the output command signal from a pulse counting data control system.

A further object of the invention is to provide a selectively presettable control signal modifier adapted to compensate for mechanical machine errors, control transducer errors, and thermal distortion to provide accuracy of positioning a response in a pulse counting machine control system.

According to this invention, a pulse counting numerical control system operable to effect positionally controlled relative movement between a pair of machine members is provided with a presettable signal modifier automatically operative to vary command signal pulses. For effecting relative movement between the pair of machine members, a screw and nut translating mechanism interconnected therebetween is driven by a servomotor responsive to the pulse counting numerical control system. To actuate the servomotor for effecting directionally controlled relative movement between the members, command data from a medium such as punch tape operates the numerical control system to supply a positional command signal. For controlling the extent of movement between the relatively movable members, the transducer connected therebetween provides a feedback error signal comprising the difference between the actual position of the members and the position required by modified positional command signals from the numerical control system. The resulting feedback error signal from the positioning transducer effects operation of the servomotor to effect the required directionally controlled relative movements between the members. In machine control systems of this type, it is necessary to maintain precise correlation between the positional command signals or effecting movements and the servo controlled movement actually effected in response to the command data. Such a correlation between command signals and actual movement, or tracking, is usually maintained within 0.002" per each inch of travel. To maintain this correlation in the present invention, a presettable signal modifier is incorporated in the control system for either adding or subtracting control pulses as may be required to compensate for predetermined measured machine inaccuracies. During rightward movement, the signal modifier is preset to add or subtract the required pulses for each inch of rightward movement. In a similar manner, the signal modifier operates to subtract or add pulses during leftward movement. During numerically controlled movement in either direction, therefore, the resulting modified positional command signal is operative to compensate for any positional distortion during each increment of relative movement as well as the cumulative distortion occurring during the total range of successive increments of movement.

The foregoing and other objects of the invention which will become more fully apparent from the following description of the control system and the machine tool herein illustrated may be achieved by the embodiments described herein and illustrated in the accompanying drawings, in which:

FIGURE 1 is a view in front elevation of a machine tool incorporating the invention;

FIG. 2 is an enlarged, fragmentary plan view of the transducer measuring scale;

FIG. 3A is a fragmentary, schematic view in block diagram form of a thermal control for selectively connecting one of a plurality of differently preset signal compensators in a numerical control system;

FIG. 6 illustrates a particular, exemplary machine error prior to compensation;

FIG. 7 illustrates the presetting of screws in a switching matrix to compensate for the machine error illustrated in FIG. 6; and, FIG. 8 illustrates the resultant compensated machine error that is represented in uncompensated form in FIG. 6.

Figure 3:
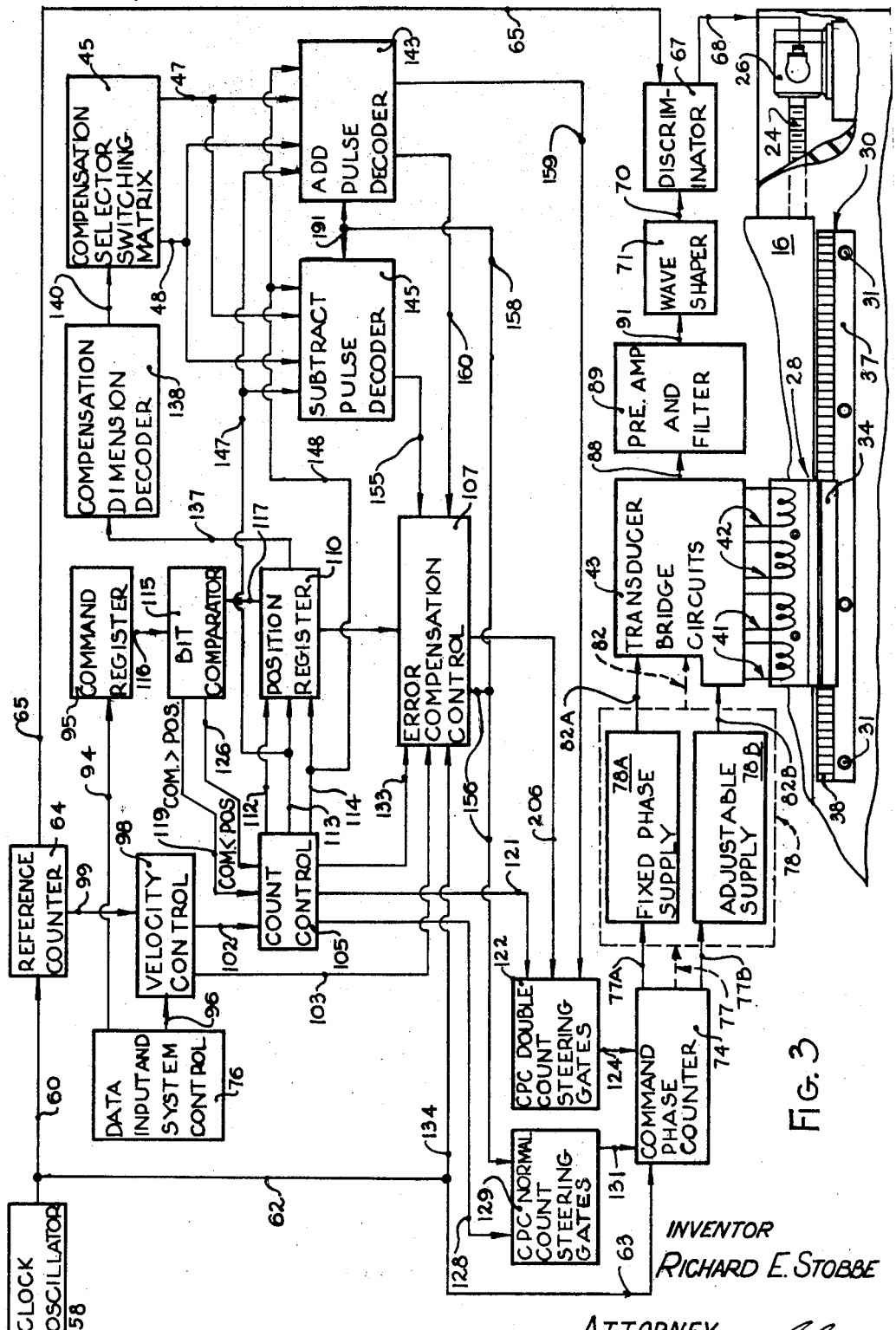
FIG. 3 is a block diagram of a numerical control system incorporating the invention in combination with the machine member driven thereby.

Referring to the drawings, there is schematically represented in FIG. 1 a machine tool incorporating a preferred form of the present invention. As there shown, the machine tool is provided with a horizontally extending bed 12 and a vertical upright or column 13 secured thereto for constituting a principal support frame. Horizontal ways 15 presented by the upper portion of the bed 12 are disposed to slidably support a worktable 16 for selective horizontal movement therealong. The usual gibs (not shown) are arranged in well-known manner to retain the worktable 16 in slidable engagement with the horizontal bed ways 15 for movement along the horizontal X axis.

A rotatable tool receiving spindle 18 is journaled to rotate about a horizontal axis in a spindle head 19 mounted for vertical sliding movement along vertical ways 20 presented by the column upright 13. For effecting selective vertical movement of the spindle head 19, a rotatable elevating screw 22 journaled at its opposite ends in an overhanging portion of the column 13 and the bed 12 engages a cooperating nut (not shown) carried by the spindle head 19. The usual power drives (not shown) are respectively connected to rotate the tool spindle 18 at a selected rate, and to rotate the elevating screw 22 for effecting vertical movement of the spindle head 19.

Thus, to perform machining operations, the tool spindle 18 is selectively movable along a vertical or Y axis relative to a workpiece (not shown) secured to the worktable 16 which is horizontally movable along the X axis. For moving the worktable 16, an internally threaded nut 25 fixedly secured thereto is threadedly engaged by a cooperating rotatable translating screw 24 journaled to rotate in the bed 12. A servomotor 26 mounted within the rightward end of the bed 12 is connected to rotate the table screw 24 for moving the worktable 16 at a selected rate and in a selected direction of movement along the X axis.

As known in the art, a vertically movable saddle (not shown) may be operatively interposed between the column 13 and the spindle head 19. In such a case, it will be apparent that the spindle head 19 may be mounted on the vertically movable saddle (not shown) for horizontal, transverse movement relative to the column 13 and worktable 16 to facilitate performing drilling operations on a workpiece (not shown) carried by the worktable 16. For accurately controlling the extent of positional movement, separate transducers are interconnected between each adjacent major pair of relatively movable members.

Inasmuch as positional control is achieved in similar manner to control a servomotor drive mechanism, it is deemed necessary to describe only the X axis control transducer 28 which is operatively interconnected between the bed 12 and horizontally movable worktable 16 carried thereby, as shown in FIG. 1. The particular position controlling transducer 28 shown for illustrative purposes in FIGS. 1, 2 and 3 is a type known commercially as "Accupin" that is manufactured and sold by the General Electric Company. Complete operating details of the "Accupin" transducer are fully explained in U.S. Patent No. 3,010,063, entitled "Position Indicating Device" and which issued Nov. 21, 1961. It is particularly emphasized, however, that the position correcting and compensating arrangement of the present invention is not limited to the transducer illustrated in FIG. 1, but can be used with equal advantage in combination with other position controlling transducers including a resolver at the end of the screw. When utilized in combination with a lineal transducer 28, such as illustrated in FIG. 1, predetermined correction signals are arranged to compensate for thermal growth or elongation of the bed 12 and a lineal elongation of the measuring scale 30 of the transducer 28. In addition, the predetermined correction signals may be arranged to compensate for mechanical errors in the machine, as well as slight inaccuracies that may exist in the lineal scale 30 of the transducer 28. Likewise, the position correcting features of the present invention provide equal advantages when used in combination with a rotary control transducer, such as a resolver (not shown) having a rotor connected to be rotated by a translating screw relative to a cooperating stationary stator, as known in the numerical machine control art. In the latter case, it will be obvious that position correcting signals of the present invention would be especially advantageous in compensating for mechanical errors in the screw and nut translating mechanism, including errors existing in the lead of the translating drive screw.

Referring again to FIG. 1, the transducer 28 comprises the rectilinear measuring scale 30 fixedly secured by spaced apart screws 31 to the bed 12, and in position to be partially encompassed by a cooperating selectively energizeable sensing device or element 34 secured by spaced screws 35 to the worktable 16 for longitudinal movement therewith. The transducer scale 30 comprises a longitudinal clamp 37 within which are secured a plurality of magnetic, cylindrical pins 38 retained in adjacent relationship. The magnetic pins 38 are of identical diameter as shown in an enlarged fragmentary planned view in FIG. 2 and are one-tenth (.1) of an inch in diameter in a manner that ten (10) adjacent pins equal one inch of lineal distance. As schematically shown in FIG. 3, the cooperating sensing device 34 is provided with two pairs of spaced apart coils 41 and 42 connected to receive the input command signals from bridge circuits 43 and being, in turn, operative to return thereto feedback error control signals for operating the servomotor 26 to control X axis positioning movement. For visually indicating the extent of X axis movement, indicia are provided along the measuring scale 30, including those represented at five, ten, fifteen and twenty inch marks, as shown in FIG. 1. The cooperating sensing device 34 is likewise provided with a scribed arrow indicated as positioned at the five inch scale mark to graphically indicate the positioning of the worktable 16 along the X axis. For moving the worktable 16 a distance of ten inches in a rightward direction, the servomotor 26 is actuated to rotate the translating screw 24 for effecting the selected ten inches of rightward movement in accordance with the command data. Rightward worktable movement is stopped upon arrival of the sensing device 34 at a predetermined null position with respect to the measuring scale 30 and with the sensing device arrow then being aligned with the fifteen inch scale mark.

The numerical control system schematically illustrated in FIG. 3 is of the well-known pulse counting type produced commercially by several different manufacturers and incorporating well-known digital techniques. The arrangement is such that each one thousand (1000) input command pulses is operative to effect movement of the worktable one tenth of an inch; thus, ten thousand input command pulses operate to effect worktable movement for one inch, equivalent to ten of the adjacent magnetic transducer pins 38. As will hereinafter be more fully explained, the input command pulses are converted to phase analog type signals for providing a phase retarding or phase leading command signal relative to the transducer scale pins 38.

As explained in the afore-mentioned U.S. Patent No. 3,010,063, the respectively interconnected pairs of coils 41 and 42 are carried by the sensing device 34 in predetermined spaced relationship relative to the circular, adjacent pins 38 comprising the cooperating measuring scale 30. As the coils 41 and 42 are moved relative to the circular pins 38, the reluctance of the air gap is changed in accordance with the amount of cross sectional area of the pins 38 present in the air gaps. As the air gap reluctance changes, during servo controlled movement in either direction along the X axis, the reluctances of the magnetic paths through the spaced apart coils 41 and 42 also change. The resulting unbalanced condition produced between the spaced apart pairs of coils 41 and 42 produces a control voltage indicating the relative position of the pins 38 and cooperating coils, as well as a feedback control voltage for effecting directional control movement in the selected direction. Such servo controlled movement continues until a null condition exists between the feedback voltage to the transducer bridge circuits 43 and the control voltage from the numerical control system.

Before proceeding with a detailed description of the control system schematically illustrated in FIG. 3, the mode of operation of the present invention is exemplified in FIGS. 6, 7 and 8. As there shown, the vertical lines in each of these three figures is indicated as having specific lineal values extending from a range of 0 inch to 6.2 inches respectively. Although the range is illustrated as 0 to 6.2 inches in FIGS. 6, 7 and 8, it will be apparent that similar principles apply to a range of 0 to 20 inches which is the range of the present machine. Although the control system is selectively operative to control X axis movement with an accuracy of one ten-thousandths of an inch for any selected lineal distance within the available range, the particular increments illustrated merely exemplify the mode of operation. Very obviously, the invention is not restricted to the particular increments shown and can be applied with equal advantage to effect pulse control corrections and other predetermined increments of movement.

FIG. 6 is a graph illustrating the uncompensated machine errors occurring in a particular machine tool. In other words, the errors indicated in FIG. 6 would be produced in the particular machine calibrated if X axis movement were provided with a pulse counting control system without utilizing the position compensating control circuit of the present invention. This, without the present invention, effecting rightward pulse counting control movement from 0 to 1.8 inches would result in a discrepancy of a positive .0004 inch between the actual position achieved and the numerically commanded position. Further, upon rightward initiated movement from 0 inch position to 5.2 inches, there would be a discrepancy of a minus .0004 inch between the actual position effected and the numerically commanded position. The actual error curve graph for a particular machine in FIG. 6 represents both the uncompensated error existing between the successive preselected increments of movement represented by the vertical lines, as well as the cumulative error occurring through several adjacent increments of movement.

In many numerically controlled machines, an error of two-thousandths of an inch would be deemed excessive. Preferably, the errors are kept below such a figure in order that machine movements can be closely controlled during machine positioning movements.

In FIG. 7, there is schematically illustrated a compensation selection matrix or signal modifier 45 comprising principally the control output conductors 47 and 48 respectively. Depending upon the particular error curve found in a machine, the conductors 47 and 48 are predeterminately connectible to the input error conductors designated for the increments of positioning movement illustrated in FIGS. 6, 7 and 8.

As schematically illustrated in FIG. 7, the horizontal conductor 47 is interconnected with selected ones of the vertical input conductors only as indicated by the screw positions at increments 2.2, 2.8, 3.2, 3.8, 4.2 and 4.8. In a similar manner, the horizontal output conductor 48 is interconnected by predetermined screw positions noted at points 0.2, 0.8, 1.2 and 5.8 inches. Unless screws are represented as interconnecting the horizontal conductors 47 and 48 to different ones of the vertical conductors, it will be understood that there are no interconnections therebetween.

During the first inch of travel, there is approximately 0.0002 of an inch of uncompensated machine error as shown in FIG. 6. To compensate for this, as shown in FIG. 7, screws S50 and S51 are predeterminately positioned to transmit control signals from vertical conductors 50 and 51 to the horizontal output conductor 48 as schematically shown in FIG. 7. The arrangement is such that the interconnection of screw S50 between conductor 50 and conductor 48 operates to subtract one pulse during rightward machine movement of one inch, and add one pulse during corresponding leftward machine movement as indicated by the caption in the counting chart 52 toward the left of FIG. 7. Since conductors 50 and 51 are both connected to output conductor 48, it will be apparent that two pulses are subtracted during rightward machine movement, and that these two pulses are then added during leftward machine movement. As hereinbefore explained, each pulse is equal to 0.001 inch of machine movement and ten thousand pulses equal one inch of movement. With the screws predeterminately positioned as shown in FIG. 7, the resultant compensated error during the first inch of machine movement is illustrated in FIG. 8. With the various screws having been positioned to interconnect the output conductors 47 and 48 to selected vertical conductors, the resultant compensated error graphically illustrated in FIG. 8 is less that an plus of minus 0.0001 of an inch.

As will hereinafter be explained, the horizontal output conductors 47 and 48 are connected to add or subtract pulses at predeterminate increments of movement during the range of travel shown for illustrative purposes. During rightward machine movement, the upper horizontal conductor 47 is connected to add a pulse at a selected increment of movement, this occurring during the up-counting operation of the control. Conversely, during leftward machine movement, the upper horizontal output conductor 47 may be selectively connected to one of the vertical input conductors to subtract a pulse. The actual predetermined setting of the various screws schematically illustrated in FIG. 7 depend upon the location and extent of the uncompensated machine errors for a particular numerical control system.

To provide a reference control signal for the pulse counting control system schematically illustrated in FIG. 3, a clock oscillator 58 is operative to produce a square wave signal at a rate of 250 kc. which is transmitted via principal output conductors 60 and 62. The conductor 60 transmits the 250 kc. signal to a reference counter 64 provided with a three decade counter (not shown) operative in known manner to convert each one thousand input signal clock pulses to one output count pulse. From the reference counter 64, therefore, a conductor 65 is connected to transmit a reference pulse train of 250 cycles per second to a position control discriminator 67. A controlling output error signal from the discriminator 67 is transmitted via a conductor 68 to selectively actuate the servomotor 26 for controlling movement of the worktable 16. It will be understood that the servomotor 26 may be of the hydraulically actuated type, as well as electrical. Inasmuch as servo drive mechanisms are known in the art, it is not deemed necessary to illustrate the details of the exact servo drive, other than to state that directional rate control is effected by an error signal from the conductor 68.

For selectively effecting operation of the servomotor 26, and depending upon the controlling feedback error signal via a conductor 70 from a wave shaper 71, the discriminator 67 operates in known manner to provide three principal different types of servo control signals. For example, with the input reference control signal along conductor 70 to the discriminator 67 in synchronism with the reference signal along the conductor 65 connected thereto, the output command signal along conductor 68 maintains the servomotor 26 a dynamic standstill, i.e., there is no command signal to effect worktable movement in either direction. With the input command phase signal along conductor 70 leading the reference signal along conductor 65, the discriminator 67 provides a phase advance signal along conductor 68 to actuate the servomotor 26 for moving the worktable in a rightward direction. Conversely, with the command phase signal along conductor 70 lagging the reference signal along conductor 65, the discriminator 67 provides a phase retardation signal along the conductor 68 for actuating the servomotor 26 to move the worktable 16 in a leftward direction. For purposes of this application, it will be assumed that the phase leading signal for effecting rightward movement occurs during "up-counting" of the count control. Likewise, it will be assumed that the phase lagging or retarding signal for effecting leftward movement occurs during "down-counting" of the count control.

From the clock oscillator 58, the conductors 60 and 62 are connected via a conductor 63 to transmit a digitally pulsed signal to a command phase counter 74. As is known in the art, a three decade counter (not shown) is provided in the command phase counter 74 for operation to count down the pulsed input control signal by a factor of one thousand in a manner similar to the reference counter 64. In the absence of X axis directional command signals from the data input and systems control 76, clock pulses from the oscillator 58 via conductor 63 are directly converted by the phase counter 74 into a control signal via a conductor 77 that is in synchronism with the reference control signal via the reference conductor 65 to provide a signal for maintaining the servomotor at a dynamic standstill, as hereinbefore explained. The command phase counter 74, however, differs from the reference counter 64 in being provided with a variable phase counter (not shown) that functions in response to tape control signals from the data input and system control 76 for providing either a phase leading or lagging output command signal via the conduit 77 to activate a controller 78; the latter being connected via a conduit 82 to selectively actuate the transducer bridge circuits 43 are schematically illustrated in FIG. 3.

As schematically illustrated in FIG. 3, the controller 78 for energizing the transducer bridge circuits actually comprises a relatively fixed phase supply 78A and an adjustable phase supply 78B, spaced in quadrature during operation of the control system. From the command phase counter 74, one phase supply signal normally in synchronism with the phase of the clock reference signal is transmitted via a conductor 77A to provide a relatively fixed phase supply 78A, which, in turn, is transmitted via an output conductor 82A to the bridge circuit 43 connected to energize the series connected windings 41 of the sensing head 34. At the same time, the command phase counter 74 is connected via another conductor 77B to provide a 90° displaced phase supply to a relatively adjustable supply 78B that is, in turn, connected via conductor 82B to the bridge circuits 43 for energizing the series connected windings 42 of the sensing head 34. During operation, the 90° phase displaced signals are continuously transmitted to the sensing head windings 41 and 42 irrespective of the operating mode of the command signals, i.e., whether the servomotor 26 is dynamically braked against movement, or whether a selected directional command signal is being supplied in response to commands from the data input for effecting worktable movement. With the output command signals along conductors 77A and 77B spaced in quadrature, the command phase counter 74 operates to provide either a leading or lagging phase change signal in accordance with the difference between the phase supply 77A and the reference signal along conductor 65. For simplicity in the drawings, the line 77 is schematically representative of the output command signals from the command phase counter 74 and is considered equivalent to the separately indicated conductors 77A and 77B that simultaneously transmit the 90° phase displaced signals. Directional command for movement is determined by the difference in phase between the reference signal pulses along conductor 65 and the command pulses transmitted from the command phase counter 74 to energize the windings 41 and 42 of the sensing head 34.

Actually, a phase difference of 360° corresponds to a distance of one-tenth (.1) of an inch along the X axis. Thus, during servo effected movement of the worktable 16, the command phase rotates through 360° corresponding to movement of one circular pin diameter relative to the spaced apart coils 41 and 42 of the sensing head 34. With the phase shift going through a complete cycle every tenth of an inch, a position register 110 functions as a memory for accurately recording table movement for multiples of a tenth of an inch.

During servo controlled movement, the phase changes linearly as the coils 41 and 42 of the sensing head 34 are moved relative to the circular pins 38 of the cooperating transducer scale 30, during which time the reluctance of the air gaps is changed in accordance with the amount of cross sectional area of the pins 38 positioned in the air gaps. Consequently, phase controlling output signals from the transducer bridge circuits 43 are transmitted via a conductor 88 to a preamplifier and filter 89, and thence via conduit 91 to the wave shaper 71 where they are reformed into a square wave signal. The output signal from the bridge circuits 43 is in phase leading or lagging relationship relative to the reference signal along conductor 65, or in synchronism therewith as hereinbefore explained, and in accordance with the output from the command phase counter 74.

For effecting movement of the worktable 16, digital command signals are supplied by the data input and system control 76 that is provided with the usual tape reader and control tape (not shown). Digital signals are transmitted from the system control 76 by one line 94 to a positional command register 95, and by another line 96 to a velocity control 98 which is connected via a conductor 99 to receive a pulse train of 250 cycles per second from the reference counter 64. The number of digital signal pulses along the conductor 94 operates to preset the command register 95 for effecting the required movement to the next desired position. At the same time, rate control signals along the conductor 96 from the system control 76 operate the velocity control 98 for predeterminately controlling the frequency of the position determining signal pulses supplied thereto via conductor 99 from the reference counter 64. As hereinbefore explained, each signal pulse represents a .0001 inch increment of travel; thus, ten thousand signal pulses equal one inch of travel corresponding to a lineal distance of ten adjacent pins 38 along the transducer scale 30. It will be apparent that the extent of movement is commensurate with the number of signal pulses, and the velocity in moving the required distance is determined by the frequency of the positional command pulses. From the velocity control 98, signals are transmitted via conductors 102 and 103 respectively connected to transmit rate controlled positional signals to a count control 105 and an error compensation control or signal modifier 107 respectively. The signal via conductor 103 operates to maintain any corrective signal pulses from the error compensation control synchronized in rate with the velocity commanded by position commanding count control 105.

Irrespective of the frequency of the pulses effected by the velocity control, the individual pulses comprising a position controlling pulse train swing or alternate between a logic zero (0), or 6 volts, and a logic one (1) or 0 volt.

Command pulses for initiating worktable movement in either selected direction are generated in the count control 105 in response to positional command signals from the data input control 76. The actual number of control pulses for effecting movement are determined by comparing the existing worktable position indicated by the position register 110 with the next selected position required by the position command register 95. The position register 110 is schematically represented as being activated by the count control 105 in a manner to continuously indicate the existing position of the worktable 16. To accomplish this, the count control 105 is connected via a conductor 113 to activate the position register for "up-counting," as would occur during rightward movement of the worktable 16. In similar manner, the count control 105 is connected via a conductor 114 to activate the position register 110 for "down-counting," such as would occur during leftward movement of the worktable 16 in accordance with the convention hereinbefore established for this invention. The position register 110 comprises a plurality of reversible counters (not shown) operable to precisely indicate the position of the worktable throughout its full range of movement and with steering signals being supplied by conductors 113 or 114 from the count control 105. Each signal pulse for effecting 0.0001 inch of worktable movement initiated in the count control 105 results in a corresponding signal pulse being transmitted to the position register 110 for indicating the actual position of the worktable 16 to a 0.0001 of an inch. Actually, the total range of worktable movement is 20 inches, and the position register 110 is operative to indicate the worktable position at all times throughout its complete range of movement. For example, with the sensing head arrow aligned with the 5 inch position on the cooperating scale 30, as shown in FIG. 1, the position register 110 in FIG. 3 indicates a worktable position of 5.0000 inches, both for controlling subsequent movement and to provide a visual readout by means of a read-out counter (not shown). During numerically controlled rightward movement of the worktable, the position register 110 is "upcounted," and during leftward movement of the worktable 16, the position register is "down-counted." As known in the art, conductor 112 is interconnected between the count control 105 and position register 110 to function as a trigger for controlling individual pulses to the position register via either of the input conductors 113 or 114.

Between the command register 95 and the position register 110, there is interconnected a bit comparator 115 by means of lines 116 and 117 respectively. If the next data controlled position required by the command register 95 is larger than the actual worktable position indicated by the position register 110, the comparator 115 provides a signal via a conductor 119 to actuate the count control 105 for generating command pulses to move the worktable 16 in a rightward direction. As this occurs, the count control 105 transmits "up-counting" signal pulses via conductor 113 to effect a corresponding change in the position register 110 that is correlated with the movement of the worktable 16 in response to operation of the servomotor 26. Thus, during movement in either direction, it will be apparent that the bit comparator 115 functions as a buffer storage or memory to retain the required positional command for effecting worktable movement until such movement is completed.

For effecting the required rightward movement of the worktable 16 in this invention, the count control 105 is operative to transmit a signal along output conductor 121 to effect selective actuation of "double count steering gates" 122. The latter are, in turn, connected via a conductor 124 for actuating the command phase counter 74 producing selected double count steering signal pulses via output conductor 77 for actuating the controller 78. The double count signals via conductor 77 operate to provide a phase advance, or phase leading signal, relative to the reference conductor 65. Consequently, as hereinbefore explained, the discriminator 67 is activated to provide an error signal via conductor 68 to operate the servo drive 26 for effecting rightward movement of the worktable 16.

If the next position required by the command register 95 is greater than the existing position of the worktable indicated by the register 110, the bit comparator 115 operates to provide a signal via a conductor 126 for actuating the count control 105 to effect leftward movement of the worktable 16. The count control 105 then operates to transmit a signal via a conductor 128 connected to actuate normal count steering gates 129. To effect leftward movement, the normal count steering gates 129 function to transmit a command signal via conductor 131 to the command phase counter 74 in a manner to skip certain command signal pulses. With certain of the command pulses having been skipped, the command phase counter 74 is then operative to transmit an output control signal via conductor 77 to the controller 78 for actuating the transducer bridge circuits 43, this signal being in phase lagging relationship to the reference control signal provided via reference conductor 65.

Irrespective of whether the bit comparator 115 operates to provide a control signal for initiating leftward or rightward table movement, the count control 105 is connected to provide a signal via an output conductor 133 which is connected to the error compensation control 107. As hereinbefore explained, the error compensation control 107 is simultaneously connected to receive a velocity control signal from conductor 103, as well as a signal from conductor 134 that is interconnected via conductors 62 and 60 to the clock oscillator 58. The input supply signals via conductors 133, 103 and 134 operate to maintain proper synchronism of any output signal pulses that are initiated by the error compensation control 107 regardless of the direction of worktable movement. Depending upon the predetermined requirements of a particular machine and control system therefor, the compensation control 107 may be operated to selectively skip certain pulses as well as add pulses during the same, single direction of movement as hereinbefore explained with reference to FIGS. 6, 7 and 8. For illustrative purposes, it will now be assumed that the numerical control system schematically illustrated in FIG. 3 has been predeterminately preset to compensate for the particular machine errors illustrated in FIG. 6.

In order to control the predetermined recurrence of plus or minus signal pulses according to the preset position of the screws, such as S50 and S51 in FIG. 7, the position register 110 in FIG. 3 is interconnected to provide a controlling signal via a conductor 137 schematically indicated to effect selective actuation of a compensation dimension decoder 138 that is operative to signal the occurrence of a particular compensating control pulse at certain predetermined, spaced apart increments of movement.

As further shown in FIG. 3, the compensation decoder 138 is connected to transmit a signal via conductor 140 to effect actuation of the compensation selector switching matrix 45 for initiating a compensating control pulse at a predetermined position of worktable movement. Whether the particular compensating pulse thus initiated by the switching matrix 45 is plus or minus depends both upon the preset positions of the pulse control, switching screws illustrated in FIG. 7, as well as the direction of worktable movement at the time a particular compensating pulse is initiated. As schematically shown in FIG. 3, the compensation selector matrix 45 is connected by separate conductors 47 and 48 to supply signals to an add pulse decoder 143 and a subtract pulse decoder 145.

In order for a compensating control pulse to be added or subtracted, appropriate control signals are supplied from the count control 105 via conductor 113 and a conductor 147 interconnected to supply signals to the subtract and add decoders 145 and 143 respectively during rightward worktable movement. During leftward worktable movement, the count control 105 is connected via conductor 114 and a conductor 148 to selectively actuate the respective pulse decoders 145 and 143 in coordinated relationship with signals supplied by conductors 47 and 48 from the compensation switching matrix 45. As will hereinafter be more fully explained, the control gating to the error compensation control 107 and decoders is so arranged as to effect selective control of the add pulse decoder 143 and the subtract pulse decoder 145 for either adding or subtracting a control pulse at a particular increment of worktable movement, and in predetermined relationship to the directional movement of the worktable 16 at that particular time. The switching control of the pulse decoders 143 and 145 to effect the required selective operation of the error compensation control 107 is arranged in accordance with the preset counting arrangement or switching matrix illustrated in FIG. 7 as hereinbefore described.

For subtracting a signal pulse at a required location during movement, as schematically shown in FIG. 3, the subtract pulse decoder 145 is actuated to transmit a signal via a control 155 to actuate the error compensation control 107, the latter being connected via an output conductor 156 to transmit a signal to the normal count steering gates for subtracting or omitting an additional signal pulse from the command signal to the command phase counter 74.

At the start of any positioning control cycle of movement, both decoders 145 and 143 are in one condition, i.e., a reset state. After actuation of decoder 145 to its set condition to supply a subtract output signal from conductor 155, the resulting output signal pulse via conductor 156 from compensation control 107 is likewise connected along conductor 158 to transmit a reset signal to the decoders 145 and 143 for returning them to normal reset conditions.

For adding a compensating signal pulse during directional movement, the add pulse decoder 143 is actuated in accordance with the direction of movement. The add pulse decoder 143 is connected via an output conductor 159 to actuate the double count steering gates for supplying the appropriate additional signal pulse to the command phase counter 74. As a prerequisite to doing this, it will be noted that the add pulse decoder 143 is additionally connected along a conductor 160 to provide a signal to the error compensation control 107. As will hereinafter be explained, the arrangement is such that actuation of the add pulse decoder 143 simultaneously transmits a signal along output conductors 159 and 160. Subsequently, the compensation control 107 is operative to provide a signal along conductor 156 to actuate the normal count steering gates for omitting or subtracting one signal pulse at the same time the decoder 143 is connected via conductor 159 to actuate steering gates 122 for providing a compensating signal of two signal pulses. The net result is that two compensating plus signals are transmitted along output conductor 124 at the same time a single subtract signal is transmitted along conductor 131, resulting in the command phase counter 74 being provided with the required single additional signal pulse.

Figure 4:
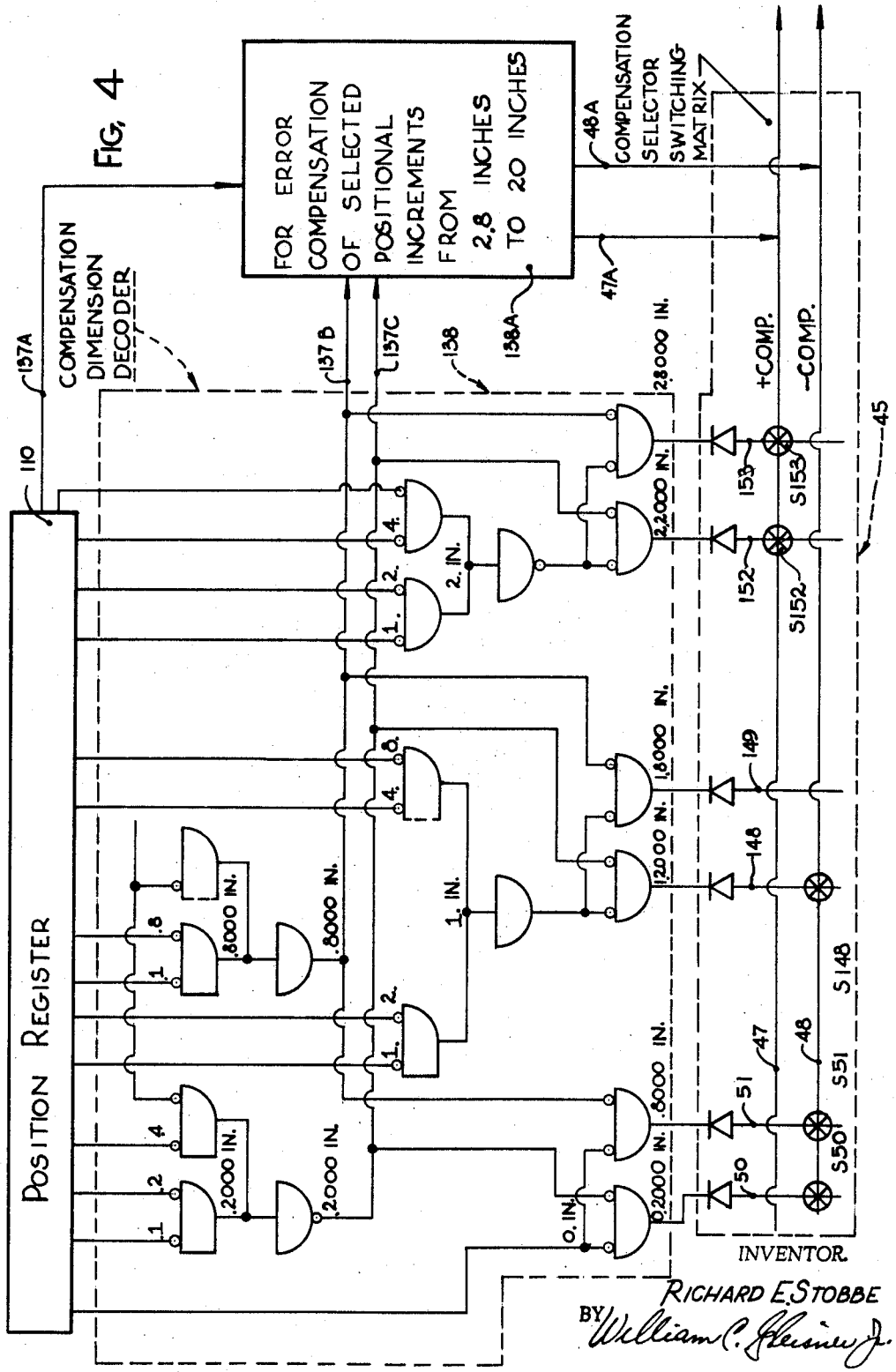
FIG. 4 is a fragmentary portion of the control circuit, partly in block diagram form, and illustrating the switch matrix or signal modifier.

As shown in FIG. 4, the position register 110 is interconnected by means of a plurality of coded output conductors to the compensation dimension decoder 138 which is adapted to produce signals along vertical output conductors 50, 51, 148, 149, 152 and 153 representing predetermined increments of positional movement that are fed into the compensation selector switching matrix 45. Each of the selected coded positional output conductors from the dimension decoder 138 is selectively connectible to one or the other of conductors 47 or 48, respectively designated as plus and minus compensating control conductors. Although schematically represented in both FIGS. 4 and 7, it will be recalled that the switching matrix 45 comprises a base plate having threaded openings (not shown), adapted to receive threaded screws for respectively interconnecting one of the vertical input conductors to one or the other of the horizontal output conductors 47 or 48 carried thereby. As schematically indicated in FIG. 4, vertical input conductors 50 and 51 are not interconnected to conductor 47 but are connected to conductor 48 by means of screws S50 and S51 respectively. Vertical input conductor 148 by-passes conductor 47 and is interconnected by a screw S148 to conductor 48. Input conductor 149 is not connected to either of the conductors 47 or 48, indicating that neither a plus or minus pulse correction is required at the 1.8 inch position. Vertical input conductor 152 for the 2.2 inch position is connected by means of screw S152 to the plus compensating control conductor 47 and is not connected to conductor 48. Likewise, vertical input conductor 153 is interconnected only to the plus conductor 47 by means of screw S153.

The compensation decoder circuit illustrated within the dashed lines 138 in FIG. 4 is deemed adequate to illustrate a portion of the binary coded circuit for predetermining selected positional increments within which pulse corrections can be effected. For illustrative purposes, it will be noted that two signal pulse corrections, either plus or minus can be effected within each inch of positional movement of the worktable. Depending upon the compensating requirements of a particular machine, it will be equally apparent that both pulse corrections for an inch can be minus; both can be plus; one plus and one minus; or, one or both omitted.

As schematically illustrated in FIG. 4, compensating pulse corrections can be effected for an additional range of movement from 2.8 inches to 20 inches inclusive. To accomplish this, there is illustrated in block diagram form an additional dimension decoder 138A interconnected to receive coded positional input signals from conductors 137A, 137B and 137C, as well as supply the required positional coded output signals via conductors 47A and 48A to horizontal output conductors 47 and 48 of the compensation selector switching matrix 45.

Referring again to the six vertical output conductors illustrated as being available from the compensation dimension decoder 138, two compensating pulses are available during each of the three successive inches of movement illustrated, although one is omitted from conductor 149. During the first inch of movement, compensating pulses are available at the 0.2 and 0.8 inch positions via the vertical output conductors 50 and 51. Since both of these conductors are connected to transmit compensating signals to the horizontal conductor 48, it should be noted that the usual ten thousand pulses required for effecting the first inch of movement are transmitted directly from the bit comparator 115 in FIG. 3 via either of the output conductors 119 or 126, depending upon the direction of movement, to effect one inch of worktable movement.

During the second inch of movement, ten thousand signal pulses are again provided to effect the second inch of travel. All of these pulses are transmitted directly from the comparator 115 in FIG. 3 to the count control for effecting the required movement, with the required compensating signal being supplied via conductors 148 and 48.

In explaining operation of the gating for controlling the compensating pulses, the individual pulses comprising a controlling pulse train swing or alternate between a logic zero (0) and a logic one (1), as hereinbefore explained. This convention is used for simplicity in illustrating the controlling effect of the input signals to the respective decoders 143 and 145 shown in FIG. 5.

Figure 5:
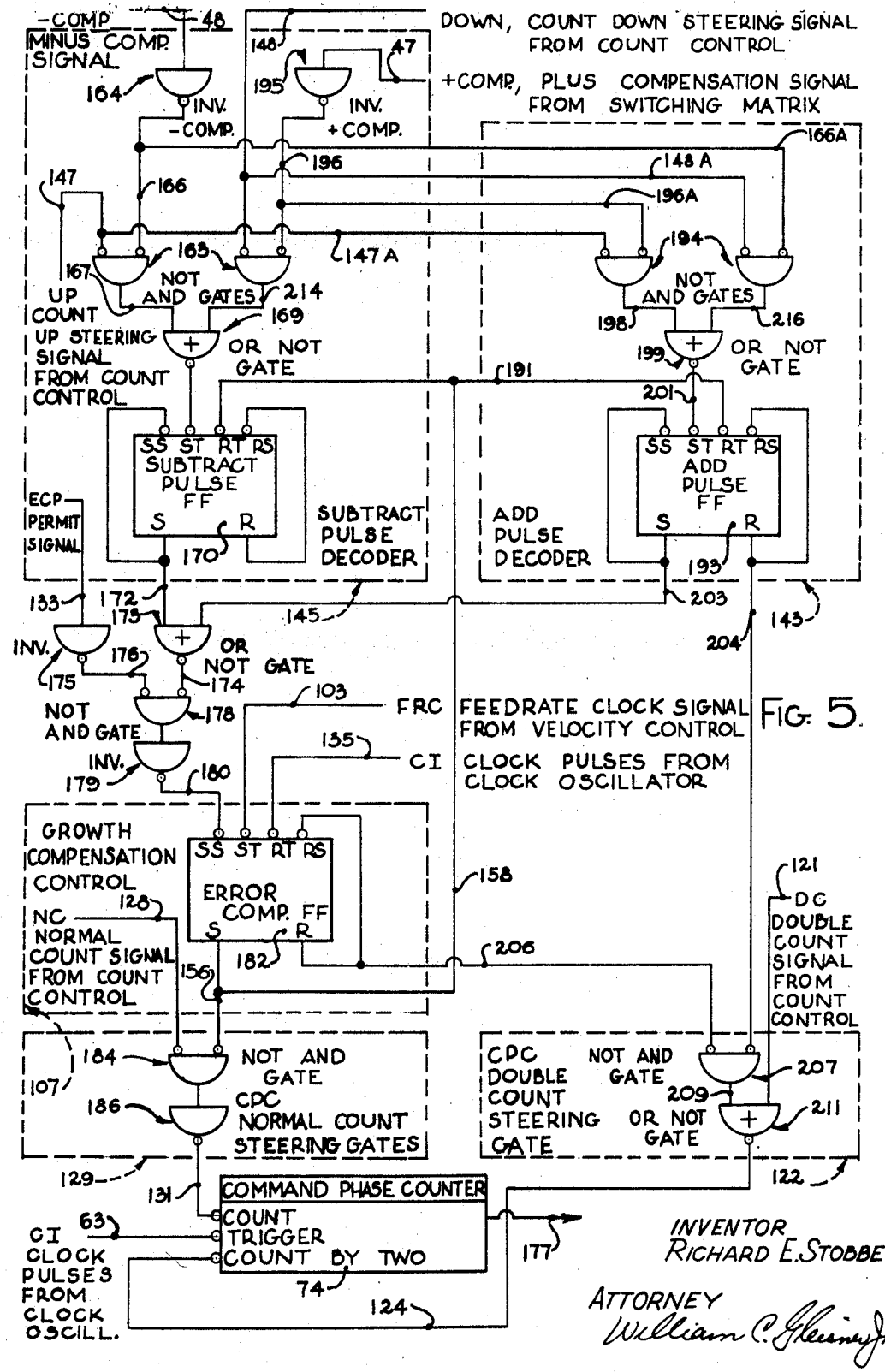
FIG. 5 is another fragmentary portion of the control circuit illustrating the modified control signals for effecting machine member movement.

Inasmuch as the plus and minus compensating signals are available during the same inch of movement and in the same direction, it will be assumed that the worktable 16 is being moved in a rightward direction to effect corresponding "up-counting" of the control and with a minus and plus compensating signal respectively occurring during such movement. During rightward movement, a corresponding "up-count" steering signal is available from the count control via conductors 113 and 147 as shown in FIGS. 3 and 5. A signal for actuating the subtract pulse decoder 145 is available whenever a logic one (1) signal pulse is transmitted via input conductor 48 to a signal inverter 164. The inverter 164 supplies via an output conductor 166 a logic zero (0) signal pulse that is in synchronism with a logic zero (0) pulse from conductor 147, thereby actuating one of the "not and" gates 163 shown in FIG. 5 to supply via conductor 167 a logic one (1) pulse to a gate 169, the latter being connected to provide a logic zero (0) pulse to the set trigger, ST contact, of a subtract pulse flip-flop 170.

As known in the art, the subtract pulse flip-flop 170 is provided with four principal input contacts including SS or set steering; ST or set trigger; RT or reset trigger; and, RS or reset steering. In addition, the flip-flop 170 is provided with two output contacts respectively including an S or a set output, and R or a reset output. Normally, the flip-flop 170 is maintained in its reset condition which means that the S output thereof is zero (0) and the R output is one (1). With that condition existing, a logic zero (0) signal applied to the ST input contact thereof will trigger the flip-flop 170 to change state and produce a logic one (1) signal via its S output contact. The set signal pulse (1) from the S output contact is transmitted via conductor 172 to a "or not" gate 173 providing an output (0) signal pulse via conductor 174 to a "not and" gate 178. At the same time, a logic one (1) signal pulse from count control 105 via conductor 133, FIGS. 3 and 5, is transmitted to an inverter 175 thereby providing a logic zero (0) output pulse to a conductor 176. With zero (0) signal pulses being supplied simultaneously via conductors 174 and 176, the "not and" gate 178 is actuated to provide a logic one (1) output signal pulse which, in turn, is changed by an inverter 179 to a logic zero (0) pulse that is transmitted by a conductor 180 to a set steering input contact SS of an error compensator flip-flop 182 associated with the error compensation control 107. As hereinbefore described with reference to the subtract pulse flip-flop 170, the compensator flip-flop 182 is likewise provided with four input contacts and two output contacts as indicated in FIG. 5. Likewise, the flip-flop 182 is normally retained in its reset condition.

Application of a logic zero (0) signal pulse via input conductor 180 to input contact SS of the flip-flop 182, as hereinbefore described however, does not immediately result in a logic one (1) output signal from the S output terminal thereof. The flip-flop 182 is triggered to provide an output signal upon transmission of the next logic zero (0) signal pulse supplied via input conductor 103 to the ST input contact from the velocity control 98, FIG. 3. Immediately upon a logic zero (0) pulse being transmitted by conductor 103 providing a like zero (0) pulse has already been supplied via conductor 180, a logic one (1) signal is supplied from the S contact of the flip-flop 182 to the output conductor 156 connected to one terminal of a "not and" gate 184.

The gate 184 is thus actuated by logic one (1) signals transmitted thereto by the conductor 156 and a conductor 128 from the count control, thereby providing a logic zero (0) output signal pulse to a normal count steering gate 186, which then functions to transmit a logic one (1) output signal pulse via conductor 187 to the command phase counter 74 for subtracting an additional input pulse thereto. The resulting output signal, minus the required compensating signal pulse from the error compensation control 107, is transmitted from the common phase counter 74 via the output conductor 77 to provide an additionally phase retarded command signal.

Upon actuation of the set trigger ST for actuating the flip-flop 182 to provide a logic one (1) signal pulse via output conductor 156, the branch conductor 158 is connected to transmit a like logic one (1) signal pulse to a reset conductor 191. The reset conductor 191 is connected to supply a reset pulse to the reset triggers RT respectively associated with the flip-flop 170 and an add pulse flip-flop 193. Thus, the logic one (1) signal pulse supplied via reset conductor 191 operates to reset whichever of the flip-flops 170 or 193 is now in its set condition. Inasmuch as only the subtract pulse flip-flop 170 has been actuated to set steering condition by transmission of a logic one (1) compensating signal along conductor 48, only the flip-flop 170 is now actuated to reset condition. At the same time, the flip-flop 193 is retained in its reset condition. Meanwhile, the error compensating flip-flop 182 is maintained in its set steering position only until the next logic one (1) signal pulse from the clock oscillator via conductor 135 actuates the reset trigger input contact RT for returning the flip-flop 182 to its normal reset condition. With the three flip-flops 170, 182 and 193 all reset, the control is again conditioned for receiving either a plus or minus compensating signal pulse from the switching matrix 45.

To provide a plus compensation signal while the worktable 16 is being moved in a rightward direction, the required signal pulses are supplied via the "up-counting" steering conductor 147 and the plus compensation conductor 47 from the coded switching matrix 45, FIG. 4. During rightward movement, a logic zero (0) signal is again supplied via conductor 147 and a conductor 147A connected to transmit the zero (0) signal pulse to one input contact of one of the "not and" gates 194, the other input contact thereof being supplied via conductor 196A. At the same time, a logic one (1) signal pulse is supplied via the conductor 47 connected to an inverter 195 that is then operative to provide a logic zero (0) output pulse to conductor 196, the latter being connected via branch conductor 196A to the gate 194 receiving the zero (0) input pulse via conductor 147A. Thereupon a logic one (1) output pulse is transmitted to a conductor 198 connected to actuate a "or not" gate 199 for supplying a zero (0) signal pulse via a conductor 201 to a set trigger input contact ST of the flip-flop 193 associated with the add pulse decoder 143. The zero (0) signal pulse from conductor 201 triggers the flip-flop 193 to change from its reset to its set state. As this occurs, the output signals from the S and R output contacts are changed to a logic one (1) pulse and a logic zero (0) pulse respectively. Thus, a logic one (1) pulse is transmitted via conductor 203 to the "or not" gate 173, thereby providing a zero (0) output signal via conductor 174 that is in synchronism with a zero (0) signal pulse supplied by conductor 176, as hereinbefore explained. Activation of the gate 178 to provide a logic one (1) output pulse thus initiates activation of the error compensation flip-flop 182 upon subsequent transmission of a zero (0) signal pulse via conductor 103 from the velocity control as hereinbefore explained. The resulting logic one (1) signal pulse supplied via conductor 156 again provides an output signal for operating the normal count steering gate 129 to provide a signal via conductor 187 therefrom for subtracting one signal pulse from the command phase counter.

As this occurs, the changing of state of flip-flop 182 provides a logic zero (0) signal pulse from the output terminal R to the conductor 206 connected to one input of a "not and" gate 207. As this occurs, and prior to resetting of flip-flop 193 in response to a signal from conductor 191, a zero (0) signal pulse has already been transmitted from the R output terminal of flip-flop 193 via conductor 204 to the gate 207. Upon occurrence of the two logic zero (0) signal pulses via conductors 204 and 206, the "not and" gate 207 in the double count steering gate 122 is actuated to provide a logic one (1) signal pulse to a conductor 209. The logic one (1) signal from conductor 209 actuates an "or not" gate 211 for transmitting a logic zero (0) signal pulse via the conductor 124 to actuate the command phase counter for counting two signal pulses. The compensating logic one (1) signal pulse via conductor 209 is transmitted during the occurrence of a zero (0) pulse from the count control 105 via conductor 121 to insure an additional plus count at the proper position. This particular two count compensating signal pulse initiated via conductor 209 is reduced by the subtract signal via conductor 187 to a single, one plus compensating signal pulse corresponding with the command plus input signal via conductor 47.

At the completion of the plus compensation signal provided as hereinbefore described, all of the flip-flops 170, 182 and 193 are returned to their normal reset starting conditions. As previously explained, flip-flops 170 and 182 are reset by a signal pulse via conductors 158 and 191; and flip-flop 182 is reset by a signal pulse along conductor 135.

During leftward worktable movement, the count control 105 operates to provide a down count signal via input conductor 114 and conductor 148 to the decoders 143 and 145. Likewise, during leftward movement, the conductor 47 is operative to provide a minus compensation signal and the conductor 48 provides a plus compensation signal with the functioning of these conductors being reversed, as hereinbefore described with reference to FIG. 7.

During leftward worktable movement therefore, a logic one (1) signal supplied from conductor 47 is changed by an inverter 195 to a logic zero (0) signal pulse along conductor 196 as shown in FIG. 5. With the zero (0) pulse along conductor 196 in synchronism with a like zero (0) pulse along conductor 148, the rightward one of the gates 163 is actuated to provide a one pulse along conductor 214. With no signal now being supplied along the conductor 167, the logic one (1) signal along conductor 214 actuates the gate 169 to provide a logic zero (0) output signal for actuating the set trigger input contact ST of the subtract pulse flip-flop 170, as hereinbefore described. With this condition existing, the error compensation flip-flop 182 is next actuated, thereby providing a logic one (1) signal pulse along output conductor 187 to subtract one single pulse to the command phase counter 74 during leftward movement.

In a similar manner, during leftward movement, a plus compensation signal is supplied by the conductor 48 operating in synchronism with the directional command signal along conductor 148 from the count control 105. The plus compensation signal is now initiated by a logic one (1) pulse from conductor 48 being changed by the inverter 164 to a logic zero (0) pulse transmitted along conductors 166 and 166A to an input for the rightward one of the gates 194. At the same time, a logic zero (0) signal pulse from conductor 148 is transmitted along conductor 148A to the other input, thereby effecting a logic one (1) output signal to a conductor 216. With no signal now being supplied via conductor 198, the conductor 216 activates a gate 199 to provide a logic zero (0) signal pulse to the conductor 201 for actuating the set trigger contact ST of the flip-flop 193 for adding a compensating pulse. As soon as this occurs, the outputs from the S and R output contacts of the flip-flop 193 respectively provide a logic one (1) signal pulse along the conductor 203 and a logic zero (0) signal pulse along conductor 204. As hereinbefore explained, the logic one (1) pulse along 203 and the logic zero (0) pulse along 204 effect the required coordinate actuation of the error compensation flip-flop 182, as well as steering gates 129 and 122 for respectively providing a single subtract pulse along conductor 187 and a double add pulse along conductor 124. As a consequence, the command phase counter 74 operates to provide a single plus compensating signal at the predetermined, required position during leftward worktable movement.

In some situations, a machine and cooperating control are required to operate at a plurality of different operating temperatures. In such a case, different error curves may be developed at each of the different operating temperatures. To compensate for the different error curves that are developed at the different range of machine operating temperatures, a plurality of different compensating dimension decoders and a plurality of different, cooperating compensation selector switching matrices are provided in combination with a temperature responsive controller operative to effect a switching connection of the required dimension decoder and switching matrix at predetermined temperature. An arrangement to accomplish this is schematically illustrated in FIG. 3A. As thereshown, the conductor 137 is connected to transmit worktable positional information from the position register 110, FIG. 3, for actuating the compensation decoders 138 and 220 respectively. With the machine operating at a predetermined low temperature, a temperature responsive controller 222 operates to maintain a relay 223 associated therewith deenerized. With this condition existing, a relay coil 224 operated by the controller 222 is deenergized, thereby maintaining an upper contact bar 226 in closed position and a lower contact bar 227 in open position. During low temperature operation, the compensation dimension decoder 138 is directly connected via conductor 140, closed contact bar 226, and a conductor 140A to actuate the compensation selector switching matrix 45 as hereinbefore described. The switching matrix 45 is likewise directly connected via output conductors 47 and 48 to effect selective actuation of the add pulse decoder 143 and the subtract pulse decoder 145, as hereinbefore described with reference to FIGS. 3 and 5.

As soon as the machine is operated at a predetermined high temperature, the temperature responsive controller 222 is operative to energize the coil 224 of relay 223, moving the normally closed upper contact 226 to open position and effecting closure of the lower contact 227. Opening of the upper contact 226 interrupts the circuit from the compensation decoder 138 to the switching matrix 45. At the same time, as schematically illustrated in FIG. 3A, closure of the lower contact bar 227 completes a circuit from the compensation decoder 220, a conductor 229, the closed contact bar 227, and conductor 229A, to actuate a compensation selector switching matrix 231 for high operating temperatures. With this condition existing, the switching matrix 231 is directly connected via a conductor 47A and the conductor 47 to effect selective actuation of the pulse decoders 143 and 145. At the same time, the switching matrix 231 is connected via a conductor 48A and the conductor 48 to effect selective actuation of pulse decoders 143 and 145. Irrespective of whether the matrix 45 or the matrix 231 is connected to be actuated by positional control signals via the input conductor 137 and one or another of the dimension decoders, the pulse decoders 143 and 145 are selectively actuatable, as hereinbefore described with reference to FIG. 5 to effect the required compensating signal.

From the foregoing detailed explanation of the operation of the exemplifying preset dimension compensator, it will appear that there has been provided a greatly improved and more accurate numerical control system including automatically operative error compensating means.

Although the illustrative embodiments of the invention have been described in considerable detail for the purpose of fully disclosing an operative structure and associated control system by means of which the invention may be practiced, it is to be understood that the particular apparatus herein described is intended to be illustrative only and that the various novel characteristics of the invention may be incorporated in other structural forms without departing from the spirit and scope of the invention as defined in the subjoined claims.

The principles of this invention having now been fully explained in connection with the foregoing description, I hereby claim as my invention:

1. In a machine tool having a pair of members carried for relative rectilinear movement;
   a servomotor drive connected to effect relative positioning movement between said members;
   a pulse counting numerical control system including a source of command data operative to provide command signal pulses to actuate said servomotor drive for effecting relative member movement;
   an error compensation control actuated upon the relative positional movement of said members and operable thereupon to transmit a compensating signal to said numerical control system for modifying the number of said command signal pulses;
   a position register operative to indicate the relative position between said members and being operative to provide selected coded output signal pulses at predetermined relative positions of said members for signaling the required position of a compensating signal; and,
   a compensation selector matrix selectively presettable to interconnect said position register for transmitting a predetermined number of add or subtract signal pulses therefrom for effecting selective actuation of said error compensation control for modifying command signal pulses from said pulse counting numerical control system to compensate for any combination of inaccuracies resulting from errors in the machine including thermal errors.

2. In a machine tool according to claim 1 wherein said compensation selector matrix includes a plurality of input conductors predeterminately coded and respectively connectible to initiate compensating signal pulses at different predetermined relative positions between said members; and,
  a cooperating output conductor connected to transmit a signal pulse from predetermined ones of said input conductors and being in turn operatively connected to actuate said error compensation control to add or subtract error compensating signal pulses at the selected relative positions during relative movement between said members.

3. A machine tool according to claim 2 including a pair of pulse decoders connected to be actuated by said output signal pulse conductor in said compensation selector matrix for selectively actuating said error compensation control to provide predetermined numbers of subtract or add pulses during relative movement between said members.

4. In a machine tool according to claim 3 including a transducer operable to indicate the relative position of said members; and,
  a command phase counter responsive to positional command signals from said numerical control system as modified by compensating signals from said error compensation control, said command phase counter being operable to transmit command signals to said transducer which provides an error signal for effecting the required movement of said power driven member in a manner that movement includes predetermined positional compensation.

5. In a machine tool having a pair of members carried for relative rectilinear movement;
  a servomotor drive connected to effect relative positioning movement between said members;
  a pulse counting numerical control system including a source of command data operative to provide command signal pulses to actuate said servomotor drive for effecting relative member movement;
  an error compensation control actuated upon the relative positional movement of said members and operable thereupon to transmit a compensating signal to said numerical control system for modifying the number of said command signal pulses;
  a switching mechanism;
  a plurality of compensation selector matrixes selectively presettable to actuate said error compensation control upon predetermined relative positional movement of said members; and,
  a temperature responsive controller operative to effect operation of said switching mechanism for connecting a predetermined one of said compensation selector matrixes to modify command signals from said numerical control system.

6. In a machine tool having a pair of members carried for relative rectilinear movement;
  a servomotor drive connected to effect relative movement between said members;
  a pulse counting numerical control system including a source of command data operative to provide command signal pulses to actuate said servomotor drive for effecting relative member movement in a selected direction;
  an error compensation control operable in coordinated relationship with said pulse counting numerical control system and including a pair of pulse transmitting pulse decoders respectively operable to transmit plus pulses and minus pulses during relative member movement in one direction, said pulse decoders being respectively operable to transmit pulses of opposite polarity during member movement in the opposite direction;
  means for selectively presetting said pulse decoders for respectively adding and subtracting pulses at different predetermined increments of relative member movement and transmitting the required signal pulse to correct the cumulative value of signal pulses in coordinated relationship with that particular relative position and direction of relative movement between said members;
  a position register operative to indicate the relative position between said members and being operative to provide selected output signal pulses at predetermined relative positions of said members for signalling the required position of a compensating signal; and,
  a compensation selector matrix selectively presettable to interconnect said position register for transmitting a predetermined number of add or subtract signal pulses therefrom for effecting selective actuation if said error compensation control for modifying command signal pulses from said pulse counting numerical control system.

References Cited

UNITED STATES PATENTS 2,988,681   6/1961   Bower.
3,218,532   11/1965  Toscano.

THOMAS E. LYNCH, Primary Examiner

U.S. Cl. X.R.

318—162